(12) United States Patent
Lotze et al.

(10) Patent No.: US 8,301,139 B2
(45) Date of Patent: Oct. 30, 2012

(54) FEMTOCELL CONFIGURATION USING SPECTRUM SENSING

(75) Inventors: Jorg Lotze, Dublin (IE); Baris Ozgul, Dublin (IE); Juan J. Noguera Serra, Dublin (IE)

(73) Assignees: Xilinx, Inc., San Jose, CA (US); The Provost, Fellows, Foundation Scholars, and the other members of Board, of the College of the Holy and Undivided Trinity of Queen Elizabeth, near Dublin, Dublin (IE)

( * ) Notice: Subject to any disclaimer, the term of this patent is extended or adjusted under 35 U.S.C. 154(b) by 529 days.

(21) Appl. No.: 12/624,243

(22) Filed: Nov. 23, 2009

(65) Prior Publication Data
US 2011/0124333 A1   May 26, 2011

(51) Int. Cl.
*H04B 1/06* (2006.01)
(52) U.S. Cl. ....... 455/434; 455/63.1; 455/450; 455/436; 370/328; 370/338
(58) Field of Classification Search .............. 455/450, 455/452, 452.1, 131, 509, 67.13, 226.1–226.3, 455/456.1, 436–444, 422.1, 434; 370/314, 370/321, 328, 336, 338, 345, 395.4, 442, 370/458, 464, 465, 468, 498; 375/130; 348/470
See application file for complete search history.

(56) References Cited

U.S. PATENT DOCUMENTS

| | | | |
|---|---|---|---|
| 5,884,145 A | 3/1999 | Haartsen | |
| 7,693,122 B2 * | 4/2010 | Carlson et al. | 370/341 |
| 8,099,057 B2 * | 1/2012 | Reudink | 455/67.13 |
| 2009/0247181 A1 * | 10/2009 | Palanki et al. | 455/452.2 |
| 2009/0252095 A1 | 10/2009 | Lu et al. | |
| 2009/0285113 A1 * | 11/2009 | Yavuz et al. | 370/252 |

OTHER PUBLICATIONS

Lotze, J., et al., "Spectrum Sensing on LTE Femtocells for GSM Spectrum Re-Farming Using Xilinx FPGAs", SDR '09 Technical Conference and Product Exposition, Dec. 2009, 6 pages.
Motorola, Inc., White Paper, LTE operations and Maintenance Strategy: Using Self-Organizing Networks to Reduce OPEX, Mar. 13, 2009, 8 pages.
O'Shea, T., et al., "Practical Signal Detection and Classification in GNU Radio", SDR Forum Technical Conference (SDR), Nov. 2007, 6 pages.
Ubiquisys ZoneGate femtocell, http://www.ubiquisys.com/up3b/zonegate.php, Sep. 4, 2009, 2 pages.

* cited by examiner

*Primary Examiner* — Kamran Afshar
*Assistant Examiner* — Marisol Fahnert
(74) *Attorney, Agent, or Firm* — LeRoy D. Maunu (57) ABSTRACT

An embodiment of the present invention provides for the ad-hoc configuration of femtocells using spectrum sensing for the selection of spectrum channels. One or more embodiments of the invention determine frequency bands that are not reserved by macrocells in a location, and perform spectrum sensing to determine communication channels in unreserved frequency bands that are being used by other femtocells in range. In this manner, femtocells can be deployed and configured in an ad-hoc manner without external coordination or control between deployed femtocells.

20 Claims, 8 Drawing Sheets

FEMTOCELL CONFIGURATION USING SPECTRUM SENSING

FIELD OF THE INVENTION

An embodiment of the present invention generally relates to wireless telecommunications and more particularly to the detection and analysis of wireless spectrum.

BACKGROUND

Global System for Mobile Communications (GSM) telecommunication systems provide wireless communication to mobile devices over a radio access network (RAN) operating in licensed bandwidth. A RAN typically consists of several macrocells, otherwise known as base transceiver stations (BTS). Each macrocell of a network is typically connected to a base station controller (BSC). The BSC controls and monitors various activities of the macrocells. For example, the BSC may help to coordinate handoff of a mobile device moving from one macrocell coverage area to another. The BSC may also coordinate operating bandwidth with neighboring macrocells to avoid interference. As the bandwidth used by mobile applications continues to increase, there is a demand to increase network capacity through frequency reuse.

Femtocells, picocells, and microcells, hereinafter referred to collectively as femtocells, are small, low-power base stations designed to provide better coverage for small residential structures, high-demand public locations or other hard to cover areas. Femtocells operate in a licensed spectrum with the authorization of the licensee and use a broadband data connection to send data to and receive data from the licensee network. Femtocells have a limited range of coverage, and as such, multiple femtocells may operate within a macrocell area.

Femtocells provide several advantages. For end-users, femtocells may reduce wireless data charges, improve indoor coverage, and reduce power consumption of mobile devices. For network operators, femtocells improve coverage, improve capacity by reducing the amount of macrocell bandwidth used, reduce traffic between a provider's macrocell and wired networks, and reduce the operator's maintenance and infrastructure costs.

Femtocells typically operate in one of two configurations. The femtocell may act as an extension to the existing network of macrocells network and provide coverage for all network users or the femtocell access may be limited to a particular set of users.

The placement and bandwidth spectrum utilized by a femtocell may adversely interfere with the operation of macrocells or other neighboring femtocells. In 3GPP Long Term Evolution (LTE) systems, connections are established in unique orthogonal frequency domain multiplexed (OFDM) subcarrier channels. LTE macrocells generally use the same frequency bands. Macrocells coordinate with each other to give mobile users at the edge of a macrocell coverage area a different subset of the available OFDM subcarriers to avoid interference. Like macrocells, femtocells must operate in using a set of OFDM subcarriers that are unique from its neighboring femtocells in order to avoid interference. Because femtocells operate outside of a coordinated network, similar coordination is generally not possible. One or more embodiments of the present invention may address one or more of these issues.

SUMMARY

In one embodiment of the present invention, a method is provided for determining available wireless communication channels. Unreserved frequency bands in a location are determined. A first channel within one of the determined unreserved frequency bands is selected and signals received on the first channel are monitored for a time duration. A power spectral density of the signals during the time duration is estimated. A spectral moving average of the estimated power spectral density is determined. A detection threshold for the first channel is determined along with a percentage of a bandwidth of the spectral moving average of the estimated power spectral density that exceeds the detection threshold. In response to the determined percentage being less than a selected percentage, data is stored indicating the first channel is available. In response to the determined percentage being greater than or equal to the selected percentage, it is determined whether a normalization of the spectral moving average of the estimated power spectral density is consistent with a selected signal shape. In response to determining the estimated averaged power spectral density is not consistent with the selected signal shape, data is stored indicating the first channel is available.

In another embodiment, a system is provided for determining available wireless communication channels. The system includes a receiver unit configured to receive signals transmitted on a plurality of communication channels and output signals received on a selected channel. An input storage unit is coupled to an output of the receiver unit and coupled to a data bus. The system also includes a signal processing unit, a processing unit, a memory unit, a storage unit, and an input-output control unit coupled to the data bus. The processing unit and signal processing unit are configured to: determine unreserved frequency bands in a location, select the selected channel from one of the determined unreserved frequency bands, and configure the receiver unit to output signals received on the selected channel. The processing and signal processing units further determine a power spectral density of the signals output by the receiver unit and determine from the power spectral density whether the signals received on the selected channel are consistent with a selected signal shape and strength indicating the channel is not available.

In yet another embodiment, a circuit for determining available wireless communication channels is provided. The circuit includes a receiver circuit configured to receive a plurality of transmitted signals and a signal processing circuit coupled to an output of the receiver circuit. A channel analysis circuit is coupled to the signal processing circuit and a channel selection controller circuit is coupled to the channel analysis circuit and to the receiver circuit. The channel selection controller circuit monitors the plurality of transmitted signals received by the receiver circuit, determines unreserved channels in a location, selects a first channel from the determined unreserved channels, and configures the receiver circuit to output signals received on the first channel. The signal processing circuit determines and outputs a power spectral density of signals output by the receiver circuit. The channel analysis circuit determines a spectral moving average of the power spectral density output by the signal processing circuit, determines a signal detection threshold level, and determines the percent of bandwidth of the first channel with a power spectral density above the signal detection threshold level. The channel analysis circuit additionally normalizes the determined spectral moving average, determines a peak and a slope of the normalized spectral moving average, and determines from the percentage and the peak and the slope whether the first channel is available.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which:

FIG. 2-1 shows a flowchart of a process for determining available wireless channels for femtocell operation;

FIG. 2-2 illustrates an estimated power spectral density of a femtocell channel;

FIG. 2-3 illustrates a spectral moving average of an estimated power spectral density;

FIG. 2-4 illustrates a normalized spectral moving average of an estimated power spectral density;

FIG. 2-5 illustrates determined slopes of a normalized spectral moving average of an estimated power spectral density;

DETAILED DESCRIPTION OF THE DRAWINGS

Many existing wireless communication standards, such as the Universal Mobile Telecommunications System (UMTS) or the IEEE 802.11b standard, operate under an interrupt-based system where users poll the communication medium to acquire communication slots. Under these standards, multiple base stations can operate using the same frequency band. Interference between base stations is mitigated though code division multiple access (CDMA), wherein each base station operates under a unique scrambling code, orthogonal to other base stations. Other communication networks, such as the Global System for Mobile Communications (GSM), utilize frequency division multiple access (FDMA) to avoid interference and increase bandwidth utilization through the reuse of frequencies in distinct regions of operation.

Unlike UMTS, Long Term Evolution (LTE) requires exclusive frequency access. LTE operates using orthogonal frequency-division multiple access (OFDMA) in the downlink and signal-carrier frequency-division multiple access (SC-FDMA) in the uplink. OFDMA is a multi-user version of orthogonal frequency-division multiplexing (OFDM), where a selected bandwidth for the downlink communication channel is divided into a large number of closely spaced orthogonal sub-bands that are used to carry data. SC-FDMA is a linearly precoded OFDMA scheme to have lower peak-to-average power ratio in the uplink transmissions. LTE supports both time-division duplexing (TDD), where downlink and uplink communication channels share the same frequency band in a time-slotted fashion, and frequency-division duplexing (FDD), where uplink and downlink communication channels are located in separate frequency bands. Based on the bandwidth efficiency it provides, TDD is considered to be a preferable option in LTE. Subcarriers in the uplink and downlink communication channels of a LTE basestation are shared in time and frequency by LTE users based on their uplink and downlink traffic demands. To avoid interference, a LTE femtocell basestation must communicate using uplink and downlink communication channels that are not overlapping in frequency with those channels used by neighboring femtocells within the range.

Because an unused portion of bandwidth is required, it is likely that LTE systems will be deployed in vacant GSM spectrum made available through frequency reuse. When LTE femtocells are deployed in bandwidth of a GSM macrocell network, the femtocells must operate using communication channels selected from frequency bands distinct from those being used by macrocells in range. Additionally, femtocells must operate using communication channels that are distinct from those used by neighboring femtocells. One or more embodiments of the present invention provides for the ad-hoc configuration of femtocells using spectrum sensing for the selection of communication channels. One or more embodiments of the invention determine frequency bands that are not reserved by macrocells in a location, and perform spectrum sensing to determine communication channels, within the unreserved frequency bands, that are being used by other femtocells in range. In this manner, femtocells can be deployed and configured in an ad-hoc manner without external coordination or control between deployed femtocells.

In networks that utilize frequency reuse, the network covers a region, which is divided and covered by several macrocells. Frequencies can be reused for non-adjacent macrocells according to a frequency reuse factor, which depends on the reuse pattern used for deployment. The frequency reuse factor is 1/K where K is the number of frequency groups used. Common frequency reuse factors are $\frac{1}{3}$, $\frac{1}{4}$, $\frac{1}{7}$, or $\frac{1}{9}$. If the total licensed bandwidth is B, the bandwidth available for use in each macrocell is B/K.

Figure 1:
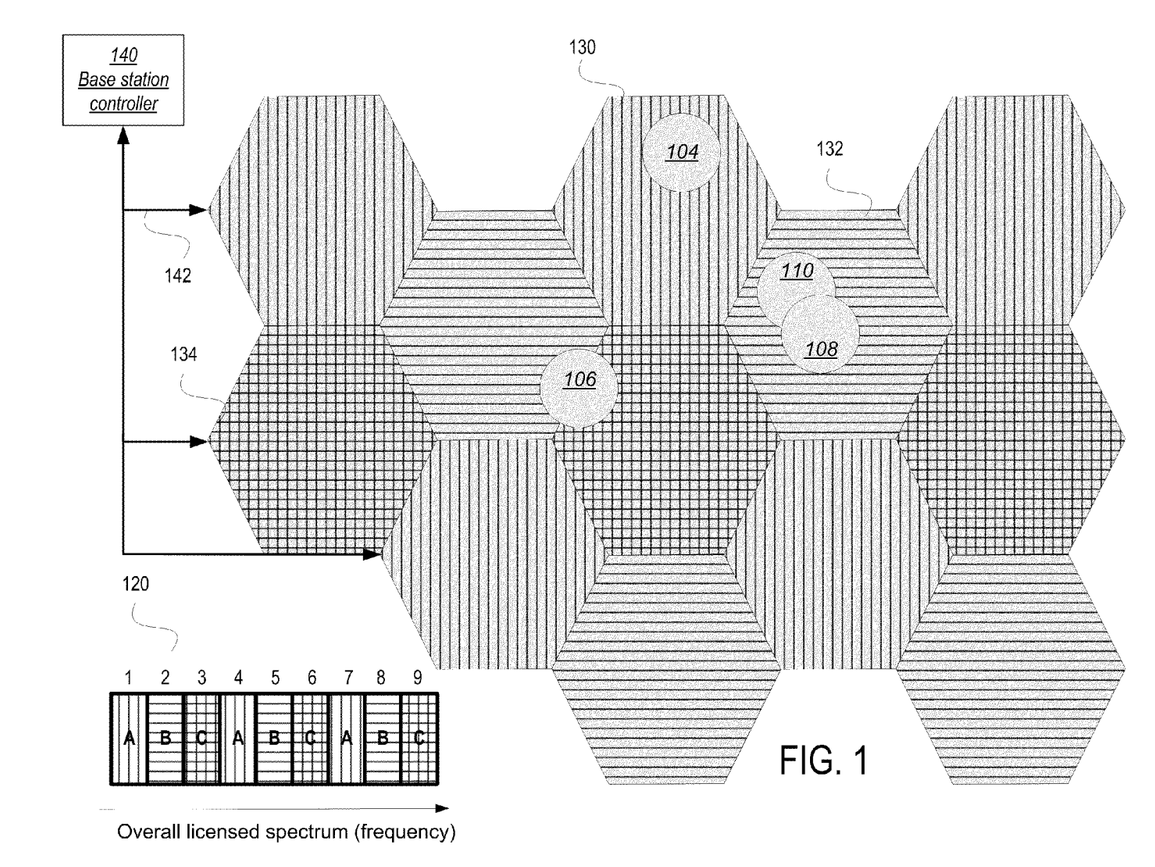
FIG. 1 is a block diagram illustrating the geographical coverage of a GSM macrocell and LTE femtocell in a GSM communication network.

FIG. 1 is a block diagram illustrating the geographical coverage of a communication network of GSM macrocells with LTE femtocells deployed within the coverage area of several macrocells. Grid 120 shows a block of licensed frequencies that has been divided into nine frequency bands. In this illustration, macrocells, exemplified by hexagons 130, 132, and 134, are evenly distributed so each covers approximately the same area. In this example, each hexagon represents the macrocell and the region covered by the macrocell. Between any two neighboring macrocell regions, some overlap exists where signals can be received by both macrocells. To avoid interference at locations of macrocell overlap, distinct sets of frequency bands for communication are reserved for neighboring macrocells. In this example layout, three distinct sets are required to avoid interference between macrocells. The nine frequency bands are divided into three groups of frequency bands A, B, and C that are evenly distributed over the licensed spectrum. The frequency distribution is generally decided and frequency bands are assigned to each macrocell by a base station controller (BSC) 140. BSC 140 communicates with the macrocells to assign frequency bands and transfer data between the network and each macrocell using wired network resources 142, such as fiber optics. Note that BSC 140 communicates with all the macrocells of FIG. 1, though the communication channel 142 is shown to connect BSC 140 to only three of the macrocells.

Several LTE femtocells 104, 106, 108, and 110 may also operate, covering smaller sub-regions within the macrocells. To avoid interference with macrocell operation, femtocells must avoid using bandwidth of frequency bands assigned to macrocells operating in the femtocell location. For example, femtocell 104 is located within macrocell region 130. Macrocell 130 operates under frequency group A, which includes frequency bands 1, 4, and 7 of licensed spectrum distribution 120. Therefore, femtocell 104 must operate using bandwidth within a frequency band from groups B or C.

For clarity, frequency bands or spectrum assigned to macrocells present in a location are referred to as reserved frequency bands. Frequency bands or spectrum not assigned to any macrocell in the location are referred to as available frequency bands. Spectrum used by a femtocell for wireless communication is referred to as a communication channel. Channels not used by other femtocells are referred to as available channels, and channels that are being used by other femtocells are referred to as unavailable channels. It is understood that the bandwidth of spectrum used for a communication channel need not be the same as the frequency bands allocated to macrocells or the same as the bandwidth used by individual mobile devices to communicate with macrocells. For example, the bandwidth of one frequency band may be sufficient to support multiple femtocell channels.

Femtocell 106 is located within a region covered by two macrocells operating under frequency band groups B and C. Therefore, femtocell 106 must select a channel within a frequency band of group A.

Femtocells must also avoid using channels used by other femtocells within range. Two femtocells 108 and 110 are located within the region covered by macrocell 132, which operates in frequency band group B. Therefore, femtocells 108 and 110 must select distinct frequency channels from frequency bands contained in groups A and C, which include frequency bands 1, 3, 4, 6, 7, and 9.

One or more embodiments of the invention are applicable to several communication standards including IEEE 802.16 (WiMAX), 3GPP-LTE, and other standards which require an exclusive set of frequency bands and where neighbor femtocells periodically send signals on each band in the exclusive set, even when no user communication is performed. For example, a standard may periodically communicate synchronization and control signals. These signals may be time-slotted, but they have to be transmitted on the entire frequency band, as is the case for LTE. The invention is also understood to be applicable to various networks in which unreserved spectrum is available, as in FDMA deployment.

Figure 21:
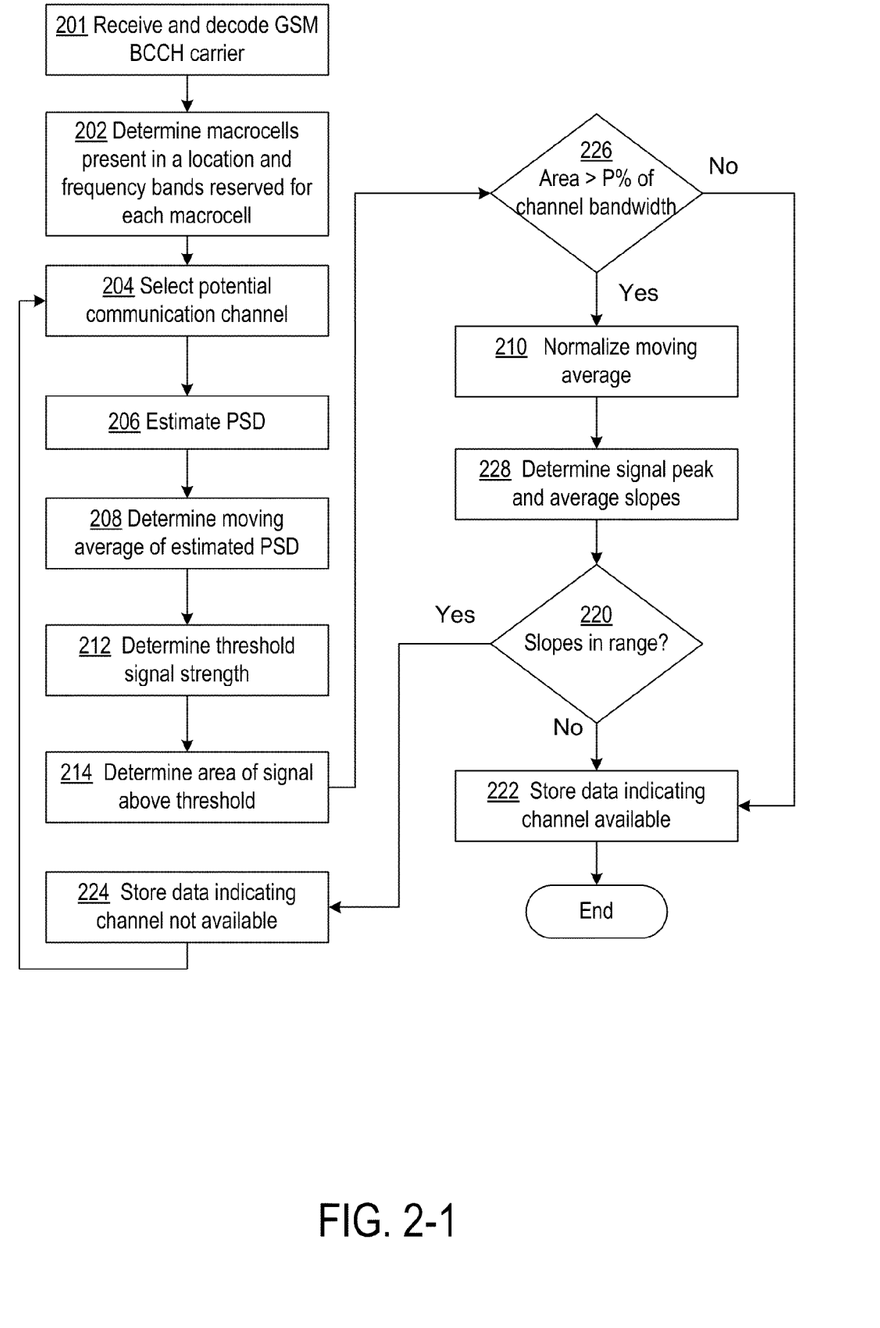

FIG. 2-1 shows a flowchart of a process for determining available wireless channels for femtocell operation. Macrocells present in a location of femtocell operation are detected and frequency bands that are not reserved for those detected macrocells are determined at step 202. In GSM networks, macrocells can be detected by monitoring the broadcast control channel (BCCH) carrier in the GSM downlink to determine the identity of the macrocell base station(s) in step 201. Once macrocell identifiers are obtained, the femtocell can look up frequency bands reserved for the macrocell(s) from a database. The database may be created and maintained by the base station controller (BSC) and may be accessed using the broadband connection used by the femtocell to connect to the licensee's network. One or more embodiments of the invention may retrieve frequency bands reserved for the macrocells in the location using a user input location identifier, such as a zip code. In such embodiments, macrocell identifiers need not be obtained.

Figure 22:
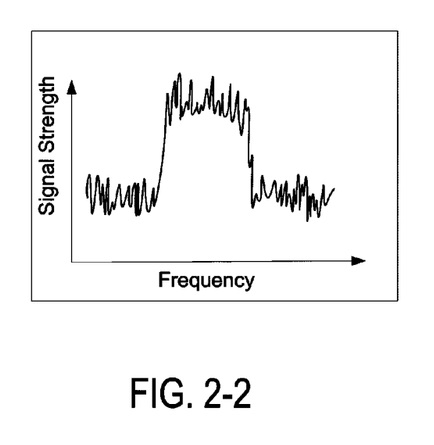

An unreserved frequency band in the licensed spectrum is selected as a potential channel at step 204. The power spectral density of the potential channel is estimated at step 206. FIG. 2-2 shows an example illustration of an estimated power spectral density of a channel. The frequency range of the power spectral density is equal to the bandwidth of the potential channel. A moving average of the estimated power spectral density in the frequency domain is calculated at step 208. One or more embodiments refer to the moving average in the frequency domain as the spectral moving average and such terms are used interchangeably herein.

Figure 23:
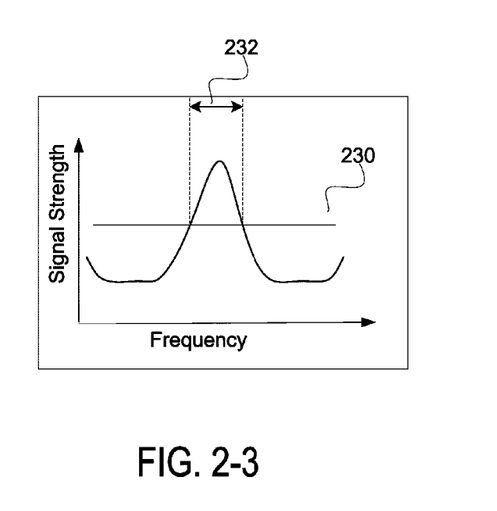

The moving average in the frequency domain is calculated using a sliding frequency domain window. The width of the window is set to the same size as the bandwidth of a femtocell signal without guard-bands. The center point of the window is moved along the frequency band of the channel in steps. At each step, the moving average of the power spectral density at the frequency of the center point is equal to the average of power spectral density data points within the window. FIG. 2-3 illustrates the spectral moving average of the power spectral density of FIG. 2-2. Application of spectral moving average windowing has the effect of smoothing the estimated power spectral density and, because the width of the moving average window is selected to fit the bandwidth of the expected LTE signal, the moving averaging effectively correlates the spectral footprint with an LTE signal shape. If the signal is an LTE signal, the signal shape created is a triangle with a peak at the center frequency. The spectral moving average of the power spectral density is also referred to as the spectral averaged power spectral density or the spectral average and such terms are used interchangeably herein A detection threshold of signal strength corresponding to data transmission is determined from the spectral averaged power spectral density at step 212. The detection threshold is determined from, $$\delta = \mu + c^*\sigma$$

where $\mu$ is the mean signal strength within the frequency band of the potential channel, c is a positive constant, and $\sigma$ is the standard deviation. The standard deviation $\sigma$ is used to ensure that signal spikes from background noise are not recognized at a transmitted data signal. Constant c acts as a scaler of the standard deviation and can be used to place the threshold slightly above the mean value plus standard deviation. Typical values for c are near the value 1. FIG. 2-3, illustrates the calculated detection threshold 230 superimposed on the spectral moving average. Frequency band 232 is the portion of the spectral average that is greater than the detection threshold.

The percentage of the spectral average with a level greater than the determined detection threshold is determined at step 214. If the signal is an LTE signal generated by another femtocell, it is expected that the bandwidth of the area above the threshold is around 50 to 70 percent of the total bandwidth of the channel. If the determined percentage is less than or equal to a predetermined percent of channel bandwidth at decision step 226, data is stored indicating the channel is available for use by the femtocell at step 222.

Figure 24:
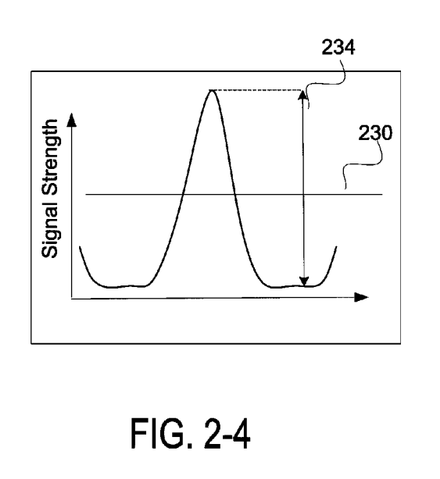

If the determined percentage is less than or equal to a predetermined percent of channel bandwidth at decision step 226, the averaged power spectral density is normalized at step 210. Normalization increases or decreases the amplitude of the spectral averaged power spectral density to a set amplitude value by uniformly scaling the amplitude over the channel bandwidth. FIG. 2-4 illustrates the spectral averaged power spectral density shown in FIG. 2-3 after normalization to a set amplitude 234. It will be appreciated that normalization may be performed at any point after determining the spectral moving average of the estimated power spectral density at step 208 and before determination of peak and slopes at step 228.

The normalized power spectral density is analyzed at steps 228 and 220 to determine whether it is consistent with the expected shape of a signal transmitted by another femtocell. In this example implementation, the shape is determined from the slopes of the normalized power spectral density. If the signal is an LTE signal generated by another femtocell, the slopes of the normalized power spectral density are expected to fall within a range of slopes.

Figure 25:
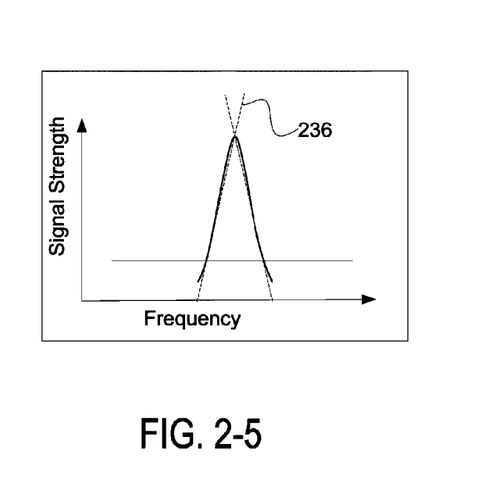

The peak and the slopes of the normalized power spectral density are determined at step 228 for the portion of the frequency band determined to be greater than the detection threshold in step 214. FIG. 2-5 illustrated determined slopes 236 superimposed on the normalized power spectral density. If the determined slopes are not within the expected range, data is stored indicating the channel is available for use by the femtocell at step 222. Conversely, if the determined slopes are within the expected range at decision step 220, data is stored at step 224 indicating the channel is not available. If the channel is determined to be not available at decision step 220, another channel is selected from the unreserved portion of the licensed bandwidth at step 204. The process is repeated until an available channel is determined.

One or more embodiments of the present invention continue to analyze channels after an available channel is found to determine the available channel with the least amount of noise present.

Figure 3:
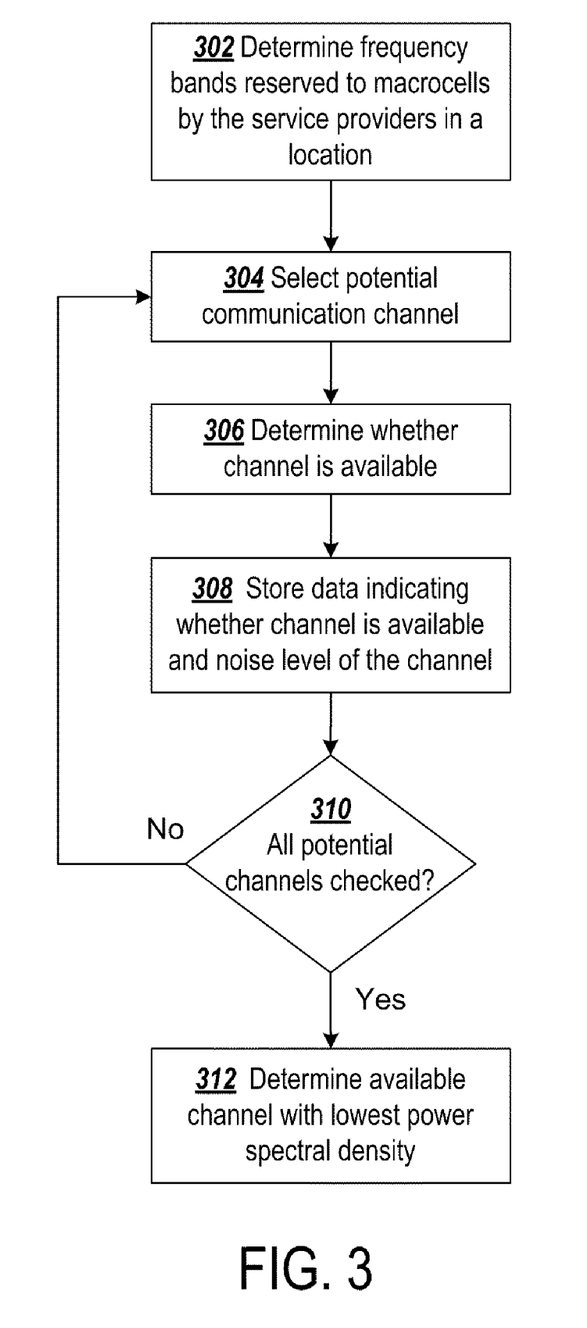
FIG. 3 shows a flowchart of a process for analyzing potentially available channels, and determining the channel with the least amount of noise present.

FIG. 3 shows a flowchart of a process for analyzing potentially available channels, and determining the channel with the least amount of noise present. Frequency bands reserved to macrocells present in a location of femtocell operation are determined at step 302. A potential communication channel is selected from the licensed frequency bands not reserved to macrocells in the location at step 304. The process determines whether the selected channel is available at step 306. This determination is performed in the manner shown in FIG. 2. Data is stored indicating whether the channel is available along with a noise level of the channel at step 308. The noise level may be determined in any number of ways. One example process for determining the noise level is to calculate the average amplitude of the power spectral density over the frequency band of the channel. The process repeats until all potential channels have been analyzed.

When decision step 310 determines all potential channels have been checked, the available channel with the lowest level of noise present is determined at step 312. If no channel is determined to be available after analysis of all potential channels, one or more embodiments will select the channel with the lowest level power spectral density to minimize interference with other femtocells. In such embodiments, data indicating the signal level of unavailable channels is stored at step 308 until an available channel is found. After an available channel is found, only information for channels determined to be available needs to be stored.

Figure 4:
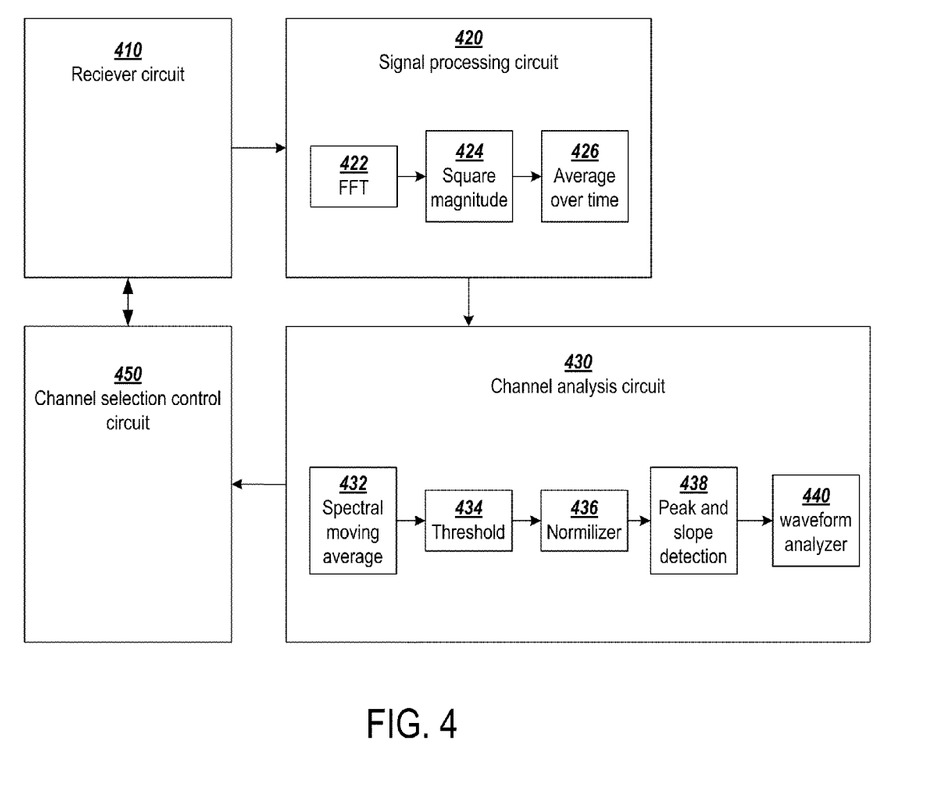
FIG. 4 shows a block diagram of a circuit for determining available channels in accordance with an embodiment of the invention.

FIG. 4 is a block diagram of an example implementation of a circuit arrangement for determining available wireless communication channels in accordance with one or more embodiments of the invention. The circuit arrangement includes a receiver circuit 410, a signal processing circuit 420, a channel analysis circuit 430, and a channel selection control circuit 450. The receiver circuit is configured to receive a plurality of transmitted signals and output signals received on a selected channel to the signal processing circuit 420. The selected channel is set by channel selection control circuit 450. The channel selection control circuit 450 is configured to monitor signals received by receiver circuit 410, and determine channels, which are unreserved in the location in which the circuit arrangement is operating. The channel selection circuit sets the selected channel to one of the determined unreserved channels.

After the selected channel has been set, the signals received on the selected channel are output by the receiver circuit to signal processing circuit 420. The signal processing circuit 420 is configured to calculate the power spectral density of the signals received from the receiver circuit 410. In the example implementation, the signal processing circuit 420 includes a circuit 422 for calculating the Fast Fourier Transform of the signal received. The calculated Fast Fourier Transform is output to and processed by circuit 424, which determines the square magnitude of the Fast Fourier Transform. The square magnitude is output to and averaged over a time duration by circuit 426 to determine the power spectral density.

The determined power spectral density is output to channel analysis circuit 430. The channel analysis circuit 430 is configured to determine from the power spectral density whether the channel is available. Circuit 430 includes circuit 432 for determining the spectral moving average of the power spectral density in the frequency domain. As discussed above, a channel is determined to be unavailable if a certain percentage of the channel bandwidth is above a detection threshold level or if the slope of the averaged and normalized power spectral density is within a certain range. Circuit 430 includes a threshold detection circuit 434 coupled to the output of circuit 432. The threshold detection circuit 434 is configured to determine a detection threshold and the percentage of channel bandwidth above the detection threshold. To determine peak and slopes of the power spectral density, channel analysis circuit 430 includes normalizer circuit 436 that normalizes a portion of the averaged power spectral density output by circuit 432 that is above the detection threshold determined by circuit 434.

One or more embodiment of the present invention alternately perform normalization prior to detecting a threshold. In such embodiments, normalizer circuit 436 is coupled to the output of circuit 432 and outputs a normalized spectral moving average to threshold detection circuit 434.

The normalized power spectral density is output to peak and slope detection circuit 438, which is configured to determine the peak and slopes of the normalized portion of the power spectral density. Waveform analyzer 440 receives the determined percentage above threshold from circuit 434 and determined peak and slopes from circuit 438. If the determined percentage is below a selected value or if the determined slopes are outside of a selected range, waveform analysis circuit 440 outputs a signal to the channel selection control circuit 450 indicating that the selected channel is available.

In one or more embodiments of the invention, the output of channel analysis circuit 430 is received by channel selection control circuit 450, as shown. If channel analysis circuit 430 indicates the channel is unavailable, channel selection control circuit 450 selects a new channel from the determined unreserved channels and configures receiver circuit 410 to receive and output transmitted signals on the new channel. If channel analysis circuit 430 indicates the channel is available, channel selection control circuit stores data indicating the selected channel is available. In one or more embodiments of the invention that analyze all channels, the channel selection control circuit stores data indicating the available channel with the lowest power spectral density.

It is understood that the various portions of the circuit may be implemented using dedicated hardware, programmable logic, or with various processing architectures.

Figure 5:
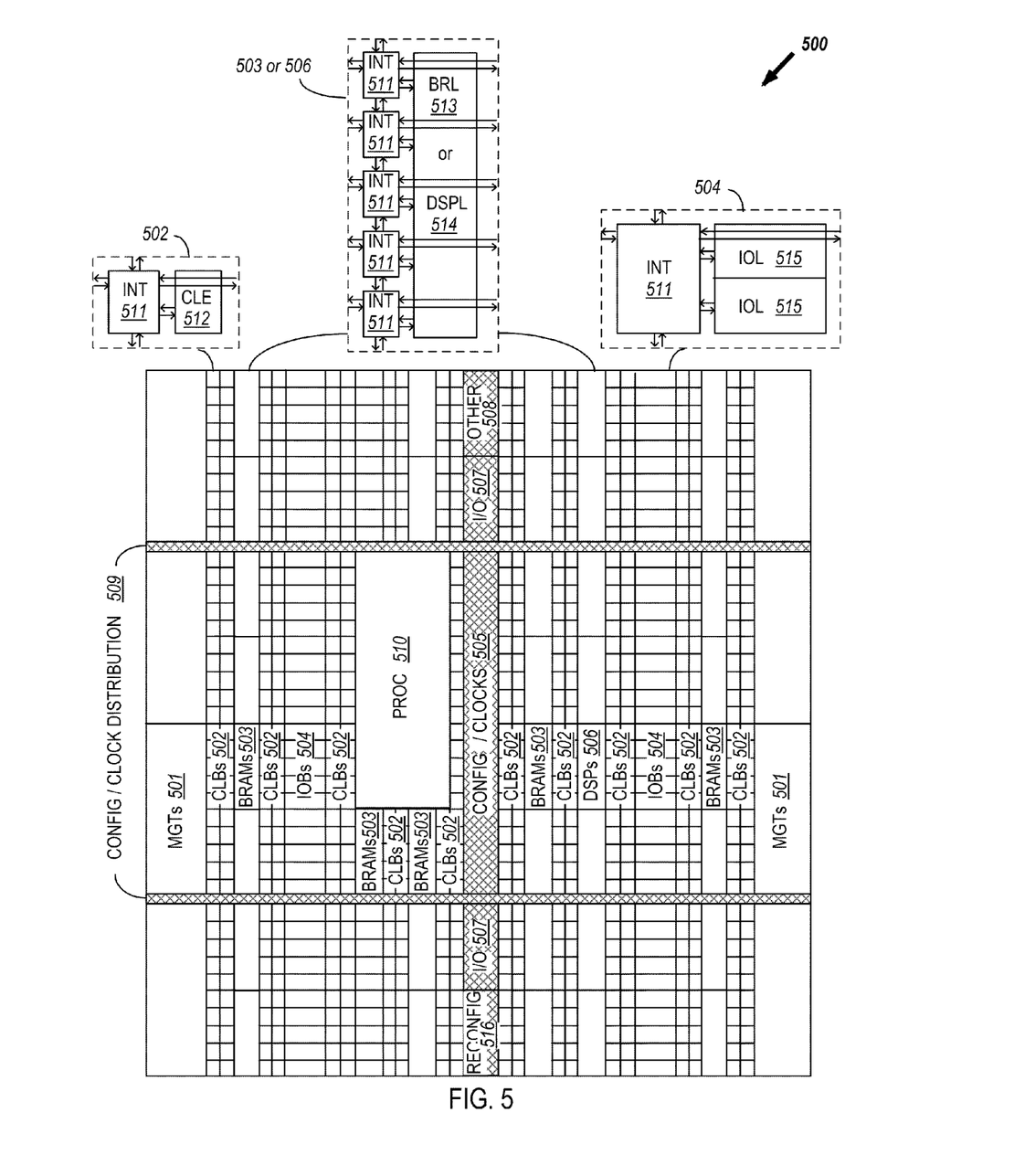
FIG. 5 is a block diagram of an example programmable logic integrated circuit which can be configured in accordance with an embodiment of the invention.

FIG. 5 is a block diagram of an example programmable logic integrated circuit, which can be configured in accordance with one or more embodiments of the invention. Programmable logic integrated circuits include several different types of programmable logic blocks in the array. For example, FIG. 5 illustrates an field programmable gate array (FPGA) architecture (500) that includes a large number of different programmable tiles including multi-gigabit transceivers (MGTs 501), configurable logic blocks (CLBs 502), random access memory blocks (BRAMs 503), input/output blocks (IOBs 504), configuration and clocking logic (CONFIG/CLOCKS 505), digital signal processing blocks (DSPs 506), a reconfiguration port (RECONFIG 516), specialized input/output blocks (I/O 507), for example, clock ports, and other programmable logic 508 such as digital clock managers, analog-to-digital converters, system monitoring logic, and so forth. Some FPGAs also include dedicated processor blocks (PROC 510).

In some FPGAs, each programmable tile includes a programmable interconnect element (INT 511) having standardized connections to and from a corresponding interconnect element in each adjacent tile. Therefore, the programmable interconnect elements taken together implement the programmable interconnect structure for the illustrated FPGA. The programmable interconnect element INT 511 also includes the connections to and from the programmable logic element within the same tile, as shown by the examples included at the top of FIG. 5.

For example, a CLB 502 can include a configurable logic element CLE 512 that can be programmed to implement user logic plus a single programmable interconnect element INT 511. A BRAM 503 can include a BRAM logic element (BRL 513) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used.

A DSP tile 506 can include a DSP logic element (DSPL 514) in addition to an appropriate number of programmable interconnect elements. DSP tiles are dedicated hardware designed to perform specialized functions. In accordance with one or more embodiments of the invention, a DSP tile 506 may be configured to perform one or signal processing functions such as, Fast Fourier Transform, square magnitude, average over time, spectral moving average over a selected bandwidth, etc.

An IOB 504 can include, for example, two instances of an input/output logic element (IOL 515) in addition to one instance of the programmable interconnect element INT 511. As will be clear to those of skill in the art, the actual I/O pads connected, for example, to the I/O logic element 515 are manufactured using metal layered above the various illustrated logic blocks, and typically are not confined to the area of the input/output logic element 515.

In the pictured embodiment, a columnar area near the center of the die (shown shaded in FIG. 5) is used for configuration, clock, and other control logic. Horizontal areas 509 extending from this column are used to distribute the clocks and configuration signals across the breadth of the FPGA.

Some FPGAs utilizing the architecture illustrated in FIG. 5 include additional logic blocks that disrupt the regular columnar structure making up a large part of the FPGA. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual FPGA more than one adjacent column of CLBs is typically included wherever the CLBs appear, to facilitate the efficient implementation of user logic.

Figure 6:
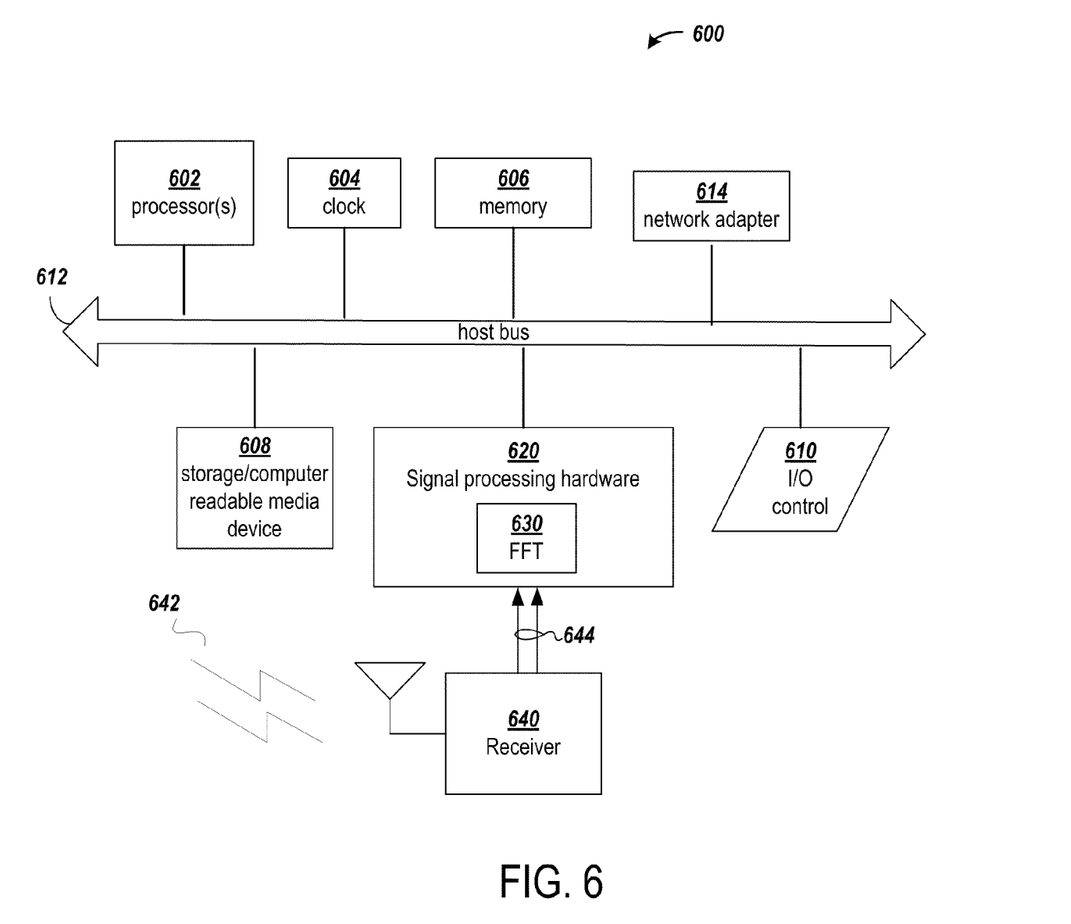
FIG. 6 illustrates a block diagram of a computing arrangement system configured to determine available wireless communication channels in accordance with an embodiment of the invention.

FIG. 6 illustrates a block diagram of a computing arrangement that may be configured to implement a system for determining available wireless communication channels in accordance with one or more embodiments of the invention. Those skilled in the art will appreciate that various alternative computing arrangements, including one or more processors and a memory arrangement configured with program code, would be suitable for hosting the processes and data structures and implementing the functions of the different embodiments of the present invention. The computer code, comprising the processes of one or more embodiments of the present invention encoded in a processor executable format, may be stored and provided via a variety of computer-readable storage media or delivery channels such as magnetic or optical disks or tapes, electronic storage devices, or as application services over a network.

Processor computing arrangement 600 includes one or more processors 602, a clock signal generator 604, a memory unit 606, a storage unit 608, an input/output control unit 610, and signal processing hardware 620 coupled to host bus 612. The arrangement 600 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor 602 may be one or more general purpose processors, or a combination of one or more general purpose processors and suitable co-processors, or one or more specialized processors (e.g., RISC, CISC, pipelined, etc.).

The memory arrangement 606 typically includes multiple levels of cache memory and a main memory. The storage arrangement 608 may include local and/or remote persistent storage such as provided by magnetic disks (not shown), flash, EPROM, or other non-volatile data storage. The storage unit may be read or read/write capable. Further, the memory 606 and storage 608 may be combined in a single arrangement.

The processor arrangement 602 executes the software in storage 608 and/or memory 606 arrangements, reads data from and stores data to the storage 608 and/or memory 606 arrangements, and communicates with external devices through the input/output control arrangement 610. These functions are synchronized by the clock signal generator 604. The resource of the computing arrangement may be managed by either an operating system (not shown), or a hardware control unit (not shown).

Receiver 640 is configured to receive radio frequency signals 642 and separate and output I and Q signal components 644. Signal processing hardware 620, is configured to perform signal processing on I and Q signal components 644 received from receiver circuit 640. The example embodiment shows receiver circuit output coupled to an input of signal processing hardware 620. It is understood that receiver circuit 640 may alternately coupled to host bus 612 and output signal components to signal processing hardware 620 over the host bus. The signal processing shown in this example embodiment includes a unit for computing the perform Fast Fourier Transform of the received signal 630.

It is understood that other signal processing functions performed by one or more embodiments of the present invention such as: determining square magnitude, determining averages in the time domain, normalization, or determining spectral moving averages, may be performed by the processing unit and memory or may alternately be implemented within signal processing hardware 620.

Figure 7:
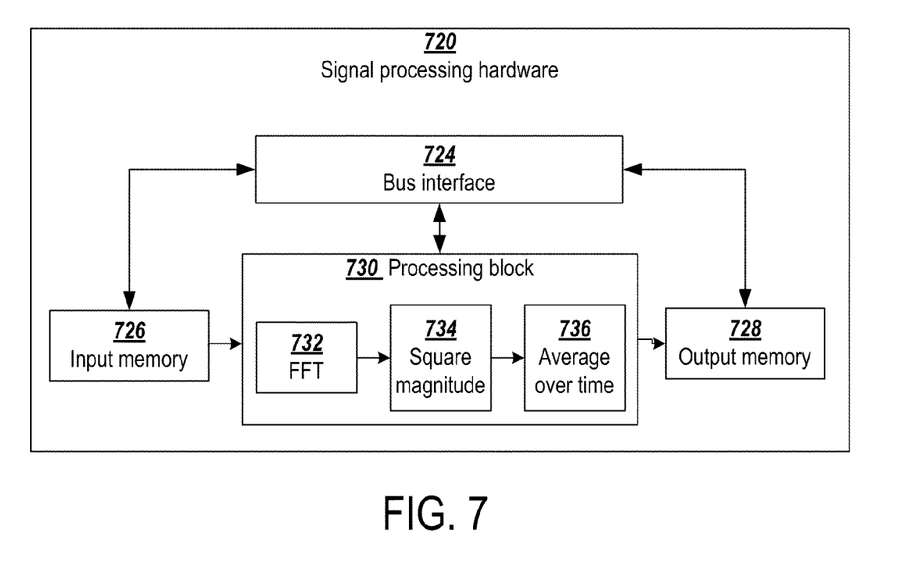
FIG. 7 illustrates a block diagram of an example implementation of signal processing hardware configured to implement several signal processing functions.

FIG. 7 illustrates a block diagram of an example implementation of the signal processing hardware of FIG. 6 configured to implement several signal processing functions. Signal processing hardware 720 includes a bus interface 724, input memory 726, output memory 728, and processing block 730. Input and output memory blocks are included, as shown, may be included to improve streaming performance of the signal processing hardware. In this example embodiment, input memory block 726 receives unprocessed signals from a receiver circuit (not shown) over a data-bus via bus interface 724. One or more embodiments of the invention couple the output of a receiver circuit to input memory block 726, as shown in FIG. 6.

Processing block 730 receives and processes unprocessed signal input of a channel. In this example implementation, the processing block includes a block for performing Fast Fourier Transform 732, a block for computing the square magnitude 734, and a block for computing a time domain average 736. It is understood, that other processing blocks for performing other signal processing functions performed in accordance with one or more embodiments of the invention may also be included in the processing block 730.

Those skilled in the art will appreciate that various alternative computing arrangements, including one or more processors and a memory arrangement configured with program code, would be suitable for hosting the processes and data structures of the different embodiments of the present invention.

One or more embodiment of the present invention is thought to be applicable to a variety of systems for determining available wireless channels. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A method of determining available wireless communication channels, comprising:
   determining unreserved frequency bands in a location;
   selecting a first channel within one of the determined unreserved frequency bands;
   monitoring signals received on the first channel for a time duration;
   estimating a power spectral density of the signals during the time duration;
   determining a spectral moving average of the estimated power spectral density;
   determining a detection threshold for the first channel;
   normalizing the spectral moving average of the estimated power spectral density;
   determining a percentage of a bandwidth of the spectral moving average of the estimated power spectral density that exceeds the detection threshold;
   in response to the determined percentage being less than a selected percentage, storing data indicating the first channel is available; and
   in response to the determined percentage being greater than or equal to the selected percentage:
      determining whether the normalized spectral moving average of the estimated power spectral density is consistent with a selected signal shape; and
      in response to determining the estimated averaged power spectral density is not consistent with the selected signal shape, storing data indicating the first channel is available.

2. The method of claim 1, wherein the determining whether the spectral moving average of the estimated power spectral density is consistent with the selected signal shape includes:
   determining a peak and slopes of the spectral moving average of the estimated power spectral density; and
   wherein the spectral moving average of the estimated power spectral density is consistent with the selected signal shape if the slopes are within a selected range.

3. The method of claim 1, wherein the determining of the unreserved frequency bands includes:
   receiving data in a broadcast control channel indicating an identity of a frequency band reservee; and
   downloading data from a database indicating frequency bands reserved for the reservee.

4. The method of claim 1, wherein downloaded data includes data indicating a bandwidth and respective center frequencies of the frequency bands reserved for the reservee.

5. The method of claim 1, wherein the determining of the frequency bands reserved for the reservee includes downloading data from a database indicating channels reserved at the location.

6. The method of claim 1, wherein the storing of data indicating the first channel is available, includes storing data indicating a level of noise present on the first channel.

7. The method of claim 1, further comprising normalizing the spectral moving average of the estimated power spectral density.

8. The method of claim 7, wherein normalizing is performed in response to the determined percentage being greater than or equal to the selected percentage.

9. The method of claim 1, wherein the estimating of the power spectral density includes:
   determining square magnitudes of an instantaneous Fast Fourier Transform of the signals; and
   averaging the determined square magnitudes over the time duration.

10. The method of claim 1, further comprising:
   wherein the determining whether the spectral moving average of the estimated power spectral density is consistent with the selected signal shape includes:
      determining a peak and slopes of the spectral moving average of the estimated power spectral density; and
      wherein the spectral moving average of the estimated power spectral density is consistent with the selected signal shape if the slopes are within a selected range;
   selecting a second channel within one of the determined unreserved frequency bands in response to the slopes being outside of the selected range; and
   repeating the steps of monitoring, estimating, determining transmission threshold and percentage, determining consistency with the selected signal shape, and storing using the second channel as the first channel.

11. The method of claim 1, further comprising:
selecting one or more additional channels within the determined unreserved frequency bands;
for each of the one or more additional channels, repeating the steps of monitoring, estimating, determining detection threshold and percentage, determining consistency with the selected signal shape, and storing using the respective channel as the first channel;
determining a set of available channels from the one or more additional channels and the first channel; and
determining a channel in the set of available channels with the lowest power spectral density.

12. A system for determining available wireless communication channels, comprising:
means for receiving signals transmitted on a plurality of communication channels and output signals received on a selected channel;
a data bus coupled to the means for receiving;
means, coupled to the data bus, for determining unreserved frequency bands in a location;
means for selecting the selected channel from one of the determined unreserved frequency bands and configuring the means for receiving signals to output signals received on the selected channel;
means for determining a power spectral density of the signals output by the receiver unit; and
means for determining from the power spectral density whether the signals received on the selected channel are consistent with a selected signal shape and strength indicating the channel is not available.

13. The system of claim 12, further comprising means for applying a spectral moving average window to the power spectral density.

14. The system of claim 12, wherein the means for determining the power spectral density includes:
means for computing Fast Fourier Transforms;
means for computing the square magnitudes coupled to an output of the means for computing Fast Fourier Transforms; and
means for averaging over a time interval coupled to an output of means for computing the square magnitudes.

15. The system of claim 14, wherein the means for determining the power spectral density further includes means for computing moving averages coupled to an output of the means for averaging over a time interval.

16. The system of claim 12, further comprising means for determining a percentage of channel bandwidth used for signal transmission.

17. The system of claim 12, further comprising:
means for determining a spectral moving average of the power spectral density;
means for normalizing the spectral moving average;
means for determining peak and average slopes of the normalized spectral moving average; and
means for determining whether the average slopes are within a selected range of slopes.

18. The system of claim 12, further comprising means for determining unreserved frequency bands, by retrieving data from a database.

19. A circuit for determining available wireless communication channels, comprising:
a receiver circuit configured to receive a plurality of transmitted signals;
a signal processing circuit coupled to an output of the receiver circuit;
a channel analysis circuit coupled to the signal processing circuit; and
a channel selection controller circuit coupled to the channel analysis circuit and to the receiver circuit; and
wherein:
the channel selection controller circuit is configured to:
monitor the plurality of transmitted signals received by the receiver circuit;
determine unreserved frequency bands in a location;
select a first channel within the determined unreserved frequency bands; and
configure the receiver circuit to output signals received on the first channel;
the signal processing circuit is configured to determine and output a power spectral density of signals output by the receiver circuit; and
the channel analysis circuit is configured to:
determine a spectral moving average of the power spectral density output by the signal processing circuit;
determine a signal detection threshold level;
determine the percent of bandwidth of the first channel with the power spectral density above the signal detection threshold level;
normalize the determined spectral moving average;
determine a peak and a slope of the normalized spectral moving average; and
determine from the determined percentage of bandwidth and the peak and the slope whether the first channel is available.

20. The circuit of claim 19, wherein in response to determining whether the selected channel is available:
the channel selection controller circuit is configured to:
select a second channel from the determined unreserved frequency bands; and
configure the receiver circuit to output signals received on the second channel;
the signal processing circuit is configured to determine and output the power spectral density of signals output by the receiver circuit; and
the channel analysis circuit is configured to:
determine a spectral moving average of the power spectral density output by the signal processing circuit;
determine a signal detection threshold level;
determine the percent of bandwidth of the selected channel with a power spectral density above the signal detection threshold level;
normalize the determined spectral moving average;
determine the peak and the slope of the normalized spectral moving average; and
determine from the determined percentage of bandwidth and the peak and the slope whether the second channel is available.

* * * * *